United States Patent
Tuli

(10) Patent No.: US 6,842,777 B1
(45) Date of Patent: Jan. 11, 2005

(54) METHODS AND APPARATUSES FOR SIMULTANEOUS ACCESS BY MULTIPLE REMOTE DEVICES

(76) Inventor: Raja Singh Tuli, 1155 Rene Levesque West, Suite 3500, Montreal, Quebec (CA), H3B 3T6

(*) Notice: Subject to any disclaimer, the term of this patent is extended or adjusted under 35 U.S.C. 154(b) by 775 days.

(21) Appl. No.: 09/677,857

(22) Filed: Oct. 3, 2000

(51) Int. Cl.$^7$ .............................................. G06F 15/16
(52) U.S. Cl. .................... 709/217; 709/203; 709/218; 709/247
(58) Field of Search ................. 709/200–203, 709/208, 217–219, 247; 370/466–467; 345/748–749

(56) References Cited

U.S. PATENT DOCUMENTS

| | | |
|---|---|---|
| 4,899,394 A | 2/1990 | Lee |
| 5,161,213 A | 11/1992 | Knowlton |
| 5,355,447 A | 10/1994 | Knowlton |
| 5,379,057 A | 1/1995 | Clough et al. |
| 5,444,763 A | 8/1995 | Lazaridis et al. |
| 5,534,893 A | 7/1996 | Hansen, Jr. et al. |
| 5,546,524 A | 8/1996 | Chow et al. |
| 5,546,538 A | 8/1996 | Cobbley et al. |
| 5,555,241 A | 9/1996 | Lazaridis et al. |
| 5,559,800 A | 9/1996 | Mousseau et al. |
| 5,581,243 A | 12/1996 | Ouellette et al. |
| 5,600,790 A | 2/1997 | Barnstijn et al. |
| 5,657,345 A | 8/1997 | Lazaridis |
| 5,682,525 A | 10/1997 | Bouve et al. |
| 5,699,255 A | 12/1997 | Ellis et al. |
| 5,701,451 A | 12/1997 | Rogers et al. |
| 5,721,908 A | 2/1998 | Lagarde et al. |
| 5,727,159 A | 3/1998 | Kikinis |
| 5,758,110 A | 5/1998 | Boss et al. |
| 5,761,663 A | 6/1998 | Lagarde et al. |

(List continued on next page.)

FOREIGN PATENT DOCUMENTS

| | | |
|---|---|---|
| EP | 0 833 260 | 1/1998 |
| EP | 0 889 402 A | 1/1999 |

(List continued on next page.)

OTHER PUBLICATIONS

International Search Report, PCT/US 01/03382, 1 pages, 2001.

(List continued on next page.)

Primary Examiner—Bharat Barot
(74) Attorney, Agent, or Firm—Blakely, Sokoloff, Taylor & Zafman LLP

(57) ABSTRACT

The present invention aims to provide a system that allows multiple users operating a PDA (Personal Digital Assistant) to access the Internet or the World Wide Web (WWW), and to be able to view and interact with these images remotely on a display screen. It is a further aim to provide a RDP (Remote Data Protocol) client and sever system to facilitate multiple PDA users simultaneously on a single server. The host computer contains an RDP server which has multiple virtual machines contained within, with each virtual machine containing a web browser. Multiple RDP clients interact with the virtual machines with a dedicated virtual machine for each client on the server. Each client is represented by software, which sends the display of the virtual machine to a single remote PDA device via a dedicated modem port. This modem port allows two way communication between a single PDA and a dedicated virtual machine on the server, via a single RDP client. By implementing multiple virtual machines and multiple RDP clients with multiple modem ports, it is now possible to communicate with multiple users of PDA devices on the RDP. The RDP client relays information received via a modem port from the PDA, such as mouse clicks or keyboard commands, to the application program in the virtual machine, which is then processed and a refreshed display sent back to the PDA via the same dedicated RDP client and modem port.

18 Claims, 7 Drawing Sheets

U.S. PATENT DOCUMENTS

| | | |
|---|---|---|
| 5,764,235 A | 6/1998 | Hunt et al. |
| 5,765,176 A | 6/1998 | Bloomberg |
| 5,768,483 A | 6/1998 | Maniwa et al. |
| 5,778,092 A | 7/1998 | MacLeod et al. |
| 5,793,964 A | 8/1998 | Rogers et al. |
| 5,802,312 A | 9/1998 | Lazaridis et al. |
| 5,809,415 A | 9/1998 | Rossmann |
| 5,810,680 A | 9/1998 | Lobb et al. |
| 5,831,679 A | 11/1998 | Montgomery et al. |
| 5,838,906 A | 11/1998 | Doyle et al. |
| 5,845,076 A | 12/1998 | Arakawa |
| 5,856,827 A | 1/1999 | Sudo |
| 5,862,348 A | 1/1999 | Pedersen |
| 5,867,662 A | 2/1999 | Riggs |
| 5,884,014 A | 3/1999 | Huttenlocher et al. |
| 5,884,056 A | 3/1999 | Steele |
| 5,893,095 A | 4/1999 | Jain et al. |
| 5,910,805 A | 6/1999 | Hickey et al. |
| 5,915,250 A | 6/1999 | Jain et al. |
| 5,923,736 A | 7/1999 | Shachar |
| 5,925,103 A | 7/1999 | Magallanes et al. |
| 5,928,324 A | 7/1999 | Sloan |
| 5,938,737 A | 8/1999 | Smallcomb et al. |
| 5,949,412 A | 9/1999 | Huntsman |
| 5,949,875 A | 9/1999 | Walker et al. |
| 5,956,716 A | 9/1999 | Kenner et al. |
| 5,961,586 A | 10/1999 | Pedersen |
| 5,961,603 A | 10/1999 | Kunkel et al. |
| 5,966,135 A | 10/1999 | Roy et al. |
| 5,974,441 A | 10/1999 | Rogers et al. |
| 5,978,835 A | 11/1999 | Ludwig et al. |
| 5,987,256 A | 11/1999 | Wu et al. |
| 5,995,102 A | 11/1999 | Rosen et al. |
| 5,995,105 A | 11/1999 | Reber et al. |
| 6,003,065 A * | 12/1999 | Yan et al. .................. 709/201 |
| 6,006,105 A | 12/1999 | Rostoker et al. |
| 6,006,231 A | 12/1999 | Popa |
| 6,006,241 A | 12/1999 | Purnaveja et al. |
| 6,008,836 A | 12/1999 | Bruck et al. |
| 6,011,546 A | 1/2000 | Bertram |
| 6,011,905 A | 1/2000 | Huttenlocher et al. |
| 6,012,083 A | 1/2000 | Savitzky et al. |
| 6,012,086 A | 1/2000 | Lowell |
| 6,014,133 A | 1/2000 | Yamakado et al. |
| 6,014,694 A | 1/2000 | Aharoni et al. |
| 6,014,706 A | 1/2000 | Cannon et al. |
| 6,016,535 A | 1/2000 | Krantz et al. |
| 6,021,409 A | 2/2000 | Burrows |
| 6,023,749 A | 2/2000 | Richardson |
| 6,026,435 A | 2/2000 | Enomoto et al. |
| 6,034,686 A | 3/2000 | Lamb et al. |
| 6,035,281 A | 3/2000 | Crosskey et al. |
| 6,047,047 A | 4/2000 | Aldridge et al. |
| 6,049,539 A | 4/2000 | Lee et al. |
| 6,049,821 A | 4/2000 | Theriault et al. |
| 6,049,831 A | 4/2000 | Gardell et al. |
| 6,052,130 A | 4/2000 | Bardon et al. |
| 6,054,985 A | 4/2000 | Morgan et al. |
| 6,057,857 A | 5/2000 | Bloomfield |
| 6,065,057 A | 5/2000 | Rosen et al. |
| 6,065,800 A | 5/2000 | Olson |
| 6,067,571 A | 5/2000 | Igarashi et al. |
| 6,072,483 A | 6/2000 | Rosin et al. |
| 6,072,598 A | 6/2000 | Tso |
| 6,073,168 A | 6/2000 | Mighdoll et al. |
| 6,073,483 A | 6/2000 | Nitecki et al. |
| 6,081,623 A | 6/2000 | Bloomfield et al. |
| 6,084,584 A * | 7/2000 | Nahi et al. .................. 709/203 |
| 6,087,952 A | 7/2000 | Prabhakaran |
| 6,092,107 A | 7/2000 | Eleftheriadis et al. |
| 6,097,352 A | 8/2000 | Zavracky et al. |
| 6,101,180 A | 8/2000 | Donahue et al. |
| 6,104,392 A | 8/2000 | Shaw et al. |
| 6,105,021 A | 8/2000 | Berstis |
| 6,108,655 A | 8/2000 | Schleimer et al. |
| 6,108,727 A | 8/2000 | Boals et al. |
| 6,118,449 A | 9/2000 | Rosen et al. |
| 6,118,899 A | 9/2000 | Bloomfield et al. |
| 6,119,135 A | 9/2000 | Helfman |
| 6,121,970 A | 9/2000 | Guedalia |
| 6,125,209 A | 9/2000 | Dorricott |
| 6,138,156 A | 10/2000 | Fletcher et al. |
| 6,157,935 A | 12/2000 | Tran et al. |
| 6,182,054 B1 | 1/2001 | Dickinson et al. |
| 6,182,127 B1 | 1/2001 | Cronin, III et al. |
| 6,185,625 B1 | 2/2001 | Tso et al. |
| 6,192,393 B1 | 2/2001 | Tarantino et al. |
| 6,195,667 B1 | 2/2001 | Duga et al. |
| 6,201,611 B1 | 3/2001 | Carter et al. |
| 6,219,465 B1 | 4/2001 | Nacman et al. |
| 6,226,400 B1 | 5/2001 | Doll |
| 6,233,541 B1 * | 5/2001 | Butts et al. .................. 370/466 |
| 6,243,761 B1 | 6/2001 | Mogul et al. |
| 6,256,750 B1 | 7/2001 | Takeda |
| 6,262,732 B1 | 7/2001 | Coleman et al. |
| 6,263,347 B1 | 7/2001 | Kobayashi et al. |
| 6,269,481 B1 | 7/2001 | Perlman et al. |
| 6,282,294 B1 | 8/2001 | Deo et al. |
| 6,285,461 B1 | 9/2001 | Fujii et al. |
| 6,286,003 B1 | 9/2001 | Muta |
| 6,289,371 B1 * | 9/2001 | Kumpf et al. ............... 709/203 |
| 6,295,059 B1 | 9/2001 | Lentz et al. |
| 6,298,162 B1 | 10/2001 | Sutha et al. |
| 6,304,928 B1 | 10/2001 | Mairs et al. |
| 6,313,880 B1 | 11/2001 | Smyers et al. |
| 6,317,781 B1 | 11/2001 | De Boor et al. |
| 6,345,279 B1 | 2/2002 | Li et al. |
| 6,356,283 B1 | 3/2002 | Guedalia |
| 6,359,603 B1 | 3/2002 | Zwern |
| 6,404,416 B1 | 6/2002 | Kahn et al. |
| 6,411,275 B1 | 6/2002 | Hedberg |
| 6,418,310 B1 * | 7/2002 | Dent .......................... 455/418 |
| 6,424,369 B1 | 7/2002 | Adair |
| 6,433,801 B1 | 8/2002 | Moon et al. |
| 6,449,639 B1 | 9/2002 | Blumberg |
| 6,463,460 B1 * | 10/2002 | Simonoff .................... 709/203 |
| 6,466,198 B1 | 10/2002 | Feinstein |
| 6,477,143 B1 | 11/2002 | Ginossar |
| 6,480,710 B1 | 11/2002 | Laybourn et al. |
| 6,487,597 B1 | 11/2002 | Horie et al. |
| 6,535,743 B1 | 3/2003 | Kennedy, III et al. |
| 6,536,043 B1 | 3/2003 | Guedalia |
| 6,539,077 B1 | 3/2003 | Ranalli et al. |
| 6,544,295 B1 | 4/2003 | Bodnar |
| 6,553,240 B1 | 4/2003 | Dervarics |
| 6,553,412 B1 | 4/2003 | Kloba et al. |
| 6,560,621 B2 | 5/2003 | Barile |
| 6,564,250 B1 | 5/2003 | Nguyen |
| 6,565,611 B1 | 5/2003 | Wilcox et al. |
| 6,571,245 B2 | 5/2003 | Huang et al. |
| 6,574,501 B2 | 6/2003 | Lambert et al. |
| 6,598,087 B1 | 7/2003 | Dixon, III et al. |
| 6,615,234 B1 | 9/2003 | Adamske et al. |
| 6,628,243 B1 | 9/2003 | Lyons et al. |
| 6,631,247 B1 | 10/2003 | Motoyama et al. |
| 6,633,314 B1 | 10/2003 | Tuli |
| 6,674,445 B1 | 1/2004 | Chithambaram et al. |
| 6,677,965 B1 | 1/2004 | Ullmann et al. |
| 6,690,403 B1 | 2/2004 | Tuli |
| 2001/0034770 A1 | 10/2001 | O'Brien |
| 2001/0047441 A1 | 11/2001 | Robertson |

| | | | |
|---|---|---|---|
| 2001/0052911 | A1 | 12/2001 | Boyle et al. |
| 2002/0015042 | A1 | 2/2002 | Robotham |
| 2002/0018234 | A1 | 2/2002 | Fu et al. |

FOREIGN PATENT DOCUMENTS

| | | |
|---|---|---|
| EP | 0 889 636 A | 1/1999 |
| EP | 890922 A2 | 1/1999 |
| EP | 1 001 613 A | 5/2000 |
| EP | 1026578 A2 | 8/2000 |
| EP | 1043876 A2 | 10/2000 |
| EP | 1109113 A2 | 6/2001 |
| GB | 2347766 A | 9/2000 |
| WO | WO 97 30556 A | 8/1997 |
| WO | WO 97 38389 A | 10/1997 |
| WO | WO 98 40842 A | 9/1998 |
| WO | WO 98 43177 A | 10/1998 |
| WO | WO 99 09658 A | 2/1999 |
| WO | WO 99/48007 | 9/1999 |
| WO | WO 0033232 A2 | 6/2000 |
| WO | WO 01 09836 A | 2/2001 |

OTHER PUBLICATIONS

International Search Report, PCT/CA 01/00114, 3 pages, 2001.

International Search Report, PCT/CA 01/00126, 3 pages, 2001.

International Search Report, PCT/CA 01/00170, 4 pages, 2002.

International Search Report, PCT/CA 01/00169, 3 pages, 2002.

International Search Report, PCT/CA 02/00048, 5 pages, 2003.

Tagawa Norio, "Data Relay System and Data Repeater Applied to the System", Patent Abstracts of Japan, vol. 1997, No. 10, Jun. 24, 1997.

Armando Fox et al, "Experience with Top Gun Wingman: a proxy–based graphical web browser fro the 3Com PalmPilot", *Middleware*, IFIP International Conference on Distributed Systems, Platforms and Open Distributed Processing, Sep. 1998, pp. 407–424.

Richard Han, et al., "Dynamic Adaptation in an Image Transcoding Proxy for Mobile Web Browsing", *IEEE Personal Communications*, Dec., 1998, pp. 8–17.

Timothy Bickmore, et al., "Web Page Filtering and Re–Authoring for Mobile Users", *The Computer Journal*, vol. 42, No. 6, 1999.

Tristan Richardson, Quentin Stafford–Fraser, Kenneth R. Wood & Andy Hopper, "Virtual Network Computing", *IEEE Internet Computing*, vol. 2 No. 1, Jan./Feb. 1998 pp. 33–38.

Citrix Systems, Inc.: "Citrix Announces New Product and Product Enhancements that Speed Web Application", citrix.com/press/news/releases/20000905_product_enhance.asp, Sep. 5, 2000.

Boutell, T. et al., "PNG (Portable Network Graphics) Specification Version 1.0", RFC 2083, pp. 1–102, Mar. 1997.

Halfhill, T.R., "Good–Bye GUI . . . Hello, NUI," BYTE Magazine, byte.com, vol. 22, No. 7, pp. 60–64, 66, 68, 70, and 72, Jul. 1997.

Mainter, L., "Returning Valvues from Forms: multipart/from–data," RFC 2388, pp. 1–9, Aug. 1998.

Jao, C.S. et al., "The display of photographic–quality images on the Web: a comparison of two technologies," IEEE Transactions on Information Technology In Biomediciene, vol. 3, iss. 1, pp. 70–73, Mar. 1999.

Kaljuvee, O. et al., "Efficient Web form entry on PDAs," ACM Proceedings of the tenth International Conference on WWW, ACM Press, ISBN: 1–58113–348–0, pp. 663–672, May 2001.

Selected pages from AT&T Wireless, Bell Atlantic Mobile, and Nextel, as delivered through the Wayback Machine, web.archieve.org.

Lewis, Ted. "Information Appliances: Gadget Netopia" *Computer*, vol. 31, issue 1, Jan. 1998, pp. 59–68.

Cimini, Leonard, J., Jr., et al. "Advanced Cellular Internet Service (ACIS)", *IEEE communications Magazine*, vol. 36, Issue 10, Oct. 1998, pp. 150–159.

Oliphant, Malcolm W. "The Mobile Phone Meets the Internet", *IEEE Spectrum*, vol. 36, Issue 8, Aug. 1999, pp. 20–28.

Lind, R., et al. "The Network Vehicle—A Glimpse into the Future of Mobile Multi–Media", *IEEE ASE Systems Magazine*, Sep. 1999, pp. 27–32.

Gbaguidi, Constant, et al. "A programmable Architecture for the Provision of Hybride Services", *IEEE communications Magazine*, vol. 27, Issue 7, Jul. 1999, pp. 110–116.

Narayanaswamy, Shankar, et al. "User Interface for the PCS Smart Phone", *IEEE Int.. Conference on Multimedia Computing and Systems*, vol. 1 Jun. 1999, pp. 777–781.

Rumba Technical Bulletin, "Configuring RUMBA LPR & LPD (16–bit)," 1996, from the web: 156.27.8.200/ts_rumba/solution/pdf/TCPIP/4002.pdf, pp. 1–11.

International Search Report, PCT/CA 02/00133, 3 pages, 2003.

International Search Report, PCT/CA 02/00048, 3 pages, 2003.

International Search Report, PCT/CA 01/01057, 2 pages, 2003.

Joel F. Bartlett, "Experience with a Wireless World Wide Web Client", Mar., 1995.

* cited by examiner

METHODS AND APPARATUSES FOR SIMULTANEOUS ACCESS BY MULTIPLE REMOTE DEVICES

BACKGROUND OF THE INVENTION

1. Field of the Invention

The invention relates to a host computer system or server, which has a web browser running on it, and the display of the web browser is transmitted via modem and received by a cellular phone connected to a PDA device which displays the image. In particular, the Remote Data Protocol of the invention consists of multiple virtual machines which are contained in the server, and each contains a browser which has applications running in them. Multiple clients are an represented by software, which sends the display of each virtual machine to the remote PDA device to be displayed, and also relays information back to the virtual machine from the PDA device.

A particular advantage of this method lies in replacing a conventional terminal on a network system with software, which communicates with the PDA device and the server.

2. Description of the Prior Art

Microsoft Remote Data Protocol uses a main server in which a virtual machine runs multiple applications. Each virtual machine is connected to a dedicated terminal or client, which displays the image of the virtual machine. The advantage of this is to avoid a dedicated computer with application programs for each client, where multiple clients may access applications on a server. All data processing is done in the sever and displayed on terminals, which is a cheaper solution for multiple clients using this Remote Data Protocol. The terminals allow keyboard and mouse commands to be transferred to the server on a network system.

SUMMARY OF THE INVENTION

The present invention relates to multiple portable high speed Internet access PDA (Personal Digital Assistant) devices that can access the Internet and World Wide Web as wireless devices, using a RDP (Remote Data Protocol) client and sever system to facilitate multiple PDA users simultaneously on a single server.

A principal embodiment has a Web server connected to the Internet. This server contains a virtual browser that takes the image displayed in the browser and converts this image into a bit map which is compressed, and communicates via telephone lines to a cellular telephone. The cellular telephone is connected to a high speed internet access device commonly referred to as a PDA (Personal Digital Assistant) which is comprised of a display screen, battery and related micro-electronics. This enables the PDA to receive, decompress and view the bit map image sent from the virtual browser, and more importantly, through cellular phone connectivity to be able to input data or commands from the PDA directly is onto the server. The host computer or server receives vector information or compressed data in the form of HTML, JPEG, etc., which is displayed on a web page. The virtual browser virtually displays a virtual image on the server. That image, in whole or in parts, is recompressed and sent to the PDA. In particular, the host computer contains an RDP server which has multiple virtual machines contained within, with each virtual machine containing a web browser. Multiple RDP clients interact with the virtual machines with a dedicated virtual machine for each client on the server. Each client is represented by software, which sends the display of the virtual machine to a single remote PDA device via a dedicated modem port. This modem port allows two way communication between a single PDA and a dedicated virtual machine on the server, via a single RDP client. By implementing multiple virtual machines and multiple RDP clients with multiple modem ports, it is now possible to communicate with multiple users of PDA devices on the RDP server to facilitate Internet browsing, electronic message communication, etc. The RDP client relays information received via a modem port from the PDA, such as mouse clicks or keyboard commands, to the application program in the virtual machine, which is then processed and a refreshed display sent back to the PDA via the same dedicated RDP client and modem port. The browser on a virtual machine relays display information to the dedicated RDP client such as bitmap files, vector files, commands, buffer information, etc. The RDP client then rasterizes some of the information by drawing it into memory and then proceeds to break up this file into smaller blocks of information. These blocks are compressed and sent to the PDA device through a dedicated modem port connected to each RDP client. The PDA would then receive, decompress and assemble the blocks of information in the original order as first received by the RDP client before the RDP client breaks up into smaller blocks. The browser running in each virtual machine rasterizes most of the information which is sent to the RDP client such as text, etc., but the RDP client may have to rasterize other information such as blocks, etc.

The PDA sends specific data to the virtual machine informing of the current location of the displayable area of the PDA screen with respect to the larger image sent from the browser. This is necessary, as the area displayed by the PDA is smaller than the displayable image on the browser window. The RDP client would send compressed blocks of data representing the image to be displayed in order of priority, such that the first blocks sent to and decompressed by the PDA are in the displayable area of the PDA, which is the current area where the user is viewing. The PDA would then decompress blocks surrounding the displayed area in a particular sequence, such as left to right across rows, and store the image in internal memory. The PDA assembles blocks of the image in a virtual page, which comprises the entire image, thus enabling the user to access any part of the present image without communicating constantly with the RDP client. Hence, as the user scrolls across the image in any direction, the blocks of data comprising the image would already be decompressed and assembled priority-wise for instant viewing. Blocks of the image in closer proximity to the displayed area of the PDA screen get decompressed and stored into internal memory on higher priority than blocks further away. The PDA continuously sends its current location to the virtual machine on the server to keep getting refreshed data instantaneously as the location changes by the user scrolling or sending commands. This enables a rapid refresh rate of the displayed image especially when scrolling, as areas surrounding the displayed image would be decompressed and already stored in memory.

A mouse click or any keyboard command is given priority in communication between the PDA and the RDP server. Such actions from the PDA are sent instantaneously, interrupting the current activities and this action directed to the web browser on the dedicated virtual machine, which sends a refreshed image back to the PDA device. This feature allows the user to have rapid response to commands. If the user initiates a mouse click or keyboard command on the PDA that does not change the displayed image on the RDP server, then the original activities are continued almost instantly with minimum interruption. However, if the image is changed and refreshed on the RDP server, any old image being sent is stopped and the new image is sent immediately to the PDA if it is a full screen image occupying all or part of the PDA display screen. If the refreshed image sent occupies a part of the PDA display screen and also areas outside the display screen, then the portion of the refreshed image that is displayed on the PDA display screen is sent first to the PDA, and blocks of the image are sent to the PDA which are decompressed and stored in internal memory, in order of priority closest to the displayed image, as previously described. Hence the PDA would assemble blocks of the image in the virtual page, which comprises the entire image, starting first with the current location of the PDA display screen then areas around it.

A beacon is sent form the PDA device to the RDP client and vice-versa many times per minute to confirm that a connection is established and maintained, for the duration of use. In the instance a user is disconnected, either the PDA or the RDP client will not receive a beacon and a time-out will be initiated, whereby both the PDA and RDP client disconnect and then reconnect.

The user would still be able to view the present image and scroll around it as this image would already be decompressed in order of priority and stored in internal memory. The PDA would indicate in a message area that a reconnect sequence was initiated, and the status of this connection to the same RDP client as before, which would refresh the PDA with the image if it has changed once reconnection is established. Similarly, the PDA would continue downloading blocks of information after being reconnected if a disconnection interrupted this operation. A beacon is not necessarily sent from the RDP client at times when it is sending information to the PDA. As long as the PDA is receiving information such as a refreshed image, or a beacon, it knows a connection is established. Consequently, when there is no new activity in the virtual machine, the RDP client must send a beacon to the PDA to confirm the connection is established. The PDA device must always send beacons to the RDP client, as commands are not sent frequently from the PDA and only for a short duration when sent.

An error protocol is implemented to verify that all information blocks are received and can be decompressed successfully. As previously described, the image displayed in the virtual browser in the virtual machine on the RDP server is broken down into smaller blocks of information and compressed and transmitted to the PDA device. The blocks are then assembled in correct sequence, decompressed and stored in internal memory on the PDA. Each block of information received is acknowledged by the PDA, which sends a signal confirming that each block is successfully received. Hence, the RDP client can monitor the successful decompression of all blocks of information sent to the PDA, and would know when a block is not acknowledged. The RDP client would also inform the PDA of the number of transmitted blocks of information, with each block identified numerically. The PDA also initiates another error protocol when a block of information received can not be successfully decompressed and stored in memory. In this case, the PDA would send an error message to the RDP client informing which block of information needs to be sent again, and the RDP client would send this block after it has completed sending the current block of information. The RDP client would monitor the acknowledgement of all blocks of information successfully decompressed, including blocks sent again after receiving error messages from the PDA device.

BRIEF DESCRIPTION OF THE DRAWINGS

The invention is described in more detail below with respect to an illustrative embodiment shown in the accompanying drawings in which.

DETAILED DESCRIPTION OF THE PREFERRED EMBODIMENTS

To facilitate description, any numeral identifying an element in one figure will represent the same element in any other figure.

Figure 4:
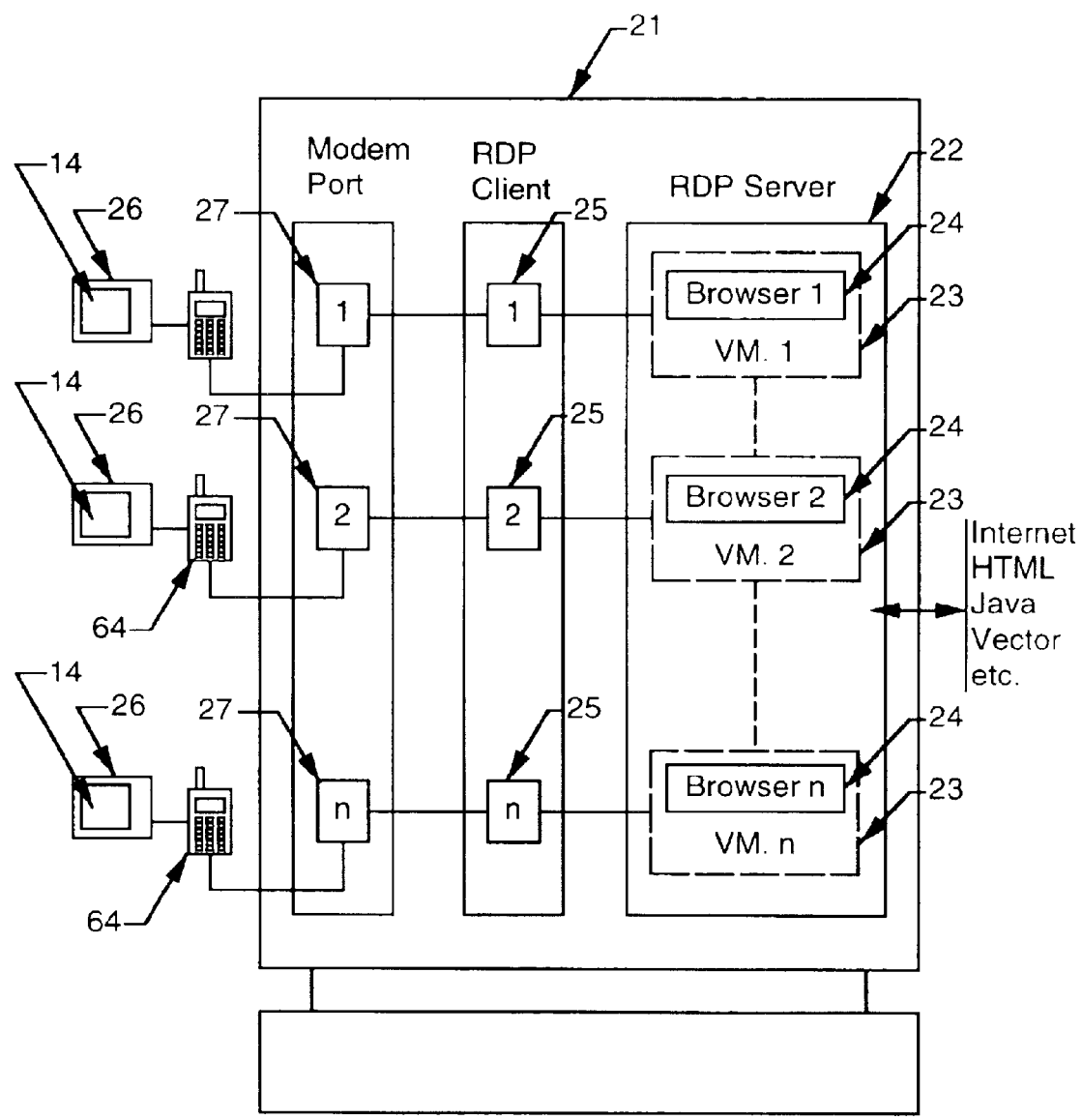
FIG. 4 illustrates the Remote Data Protocol of the present invention.

The principal embodiment of the present invention aims to provide a system that allows multiple users operating PDA (Personal Digital Assistant) devices similar to a palm top computer to access the Internet or the World Wide Web (WWW), as demonstrated in FIG. 4. It is a further aim of the present invention, to provide a RDP (Remote Data Protocol) client and sever system to facilitate multiple PDA users simultaneously on a single server.

Figure 1:
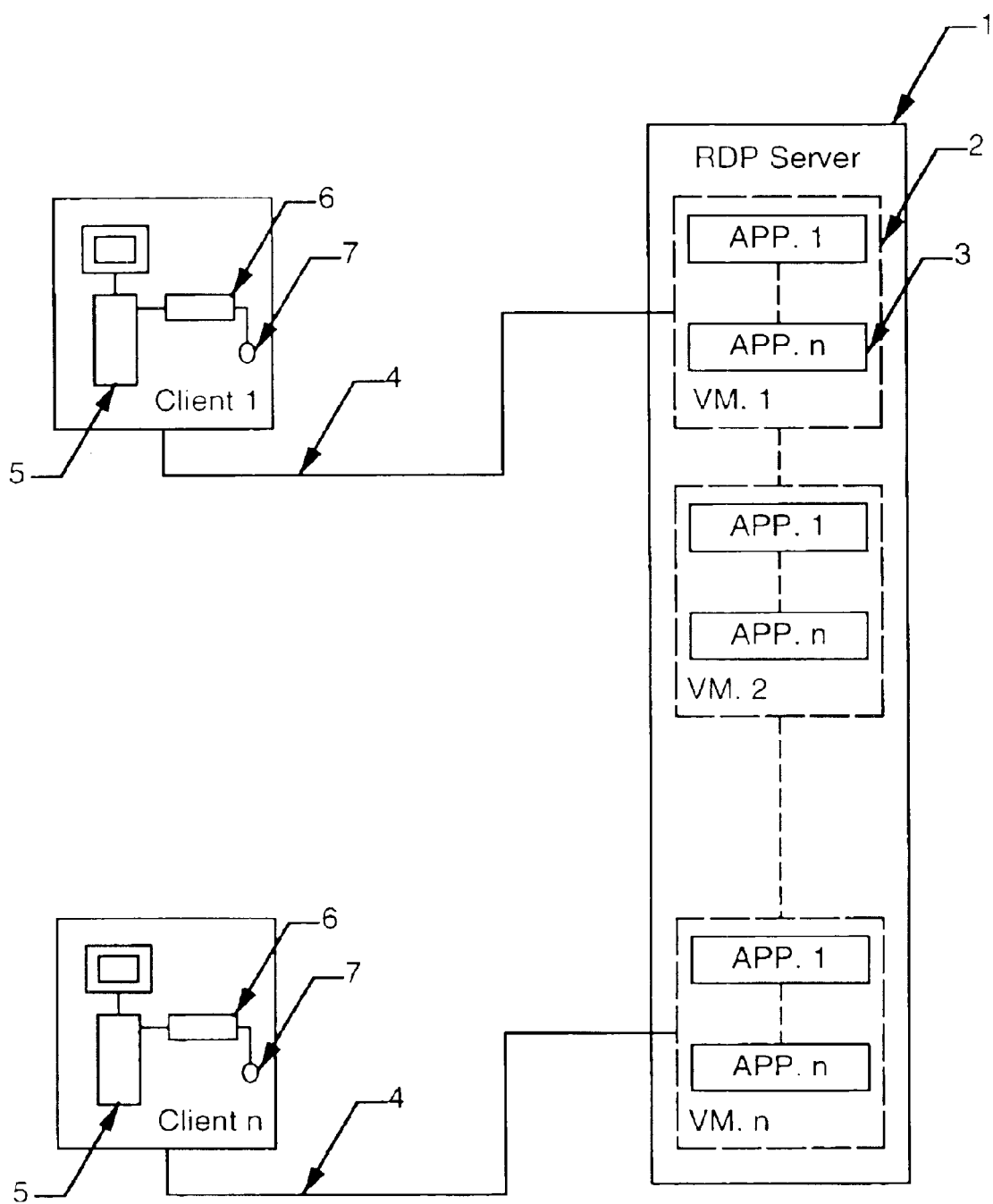
FIG. 1 illustrates Prior Art whereby a PDA device is connected to a cellular phone, which communicates wirelessly to a Host Computer.

Prior art is disclosed in FIG. 1 where Microsoft Remote Data Protocol is demonstrated, using a main RDP server 1 in which virtual machines 2 exist capable of running multiple application programs 3. Each virtual machine 2 is connected to a dedicated terminal 5 or client on a network system 4, which displays the image of the virtual machine. The terminals 5 on the network allow input of keyboard 6 and mouse 7 commands to the RDP server 1, with all data processing done on the server and displayed on the terminals. In this method of prior art, the RDP clients are the terminals on the network. In the present invention however, the RDP clients are represented by software which interact between the virtual machines on the RDP server and the PDA devices which display the image of the RDP clients, in a completely different fashion.

Figure 2:
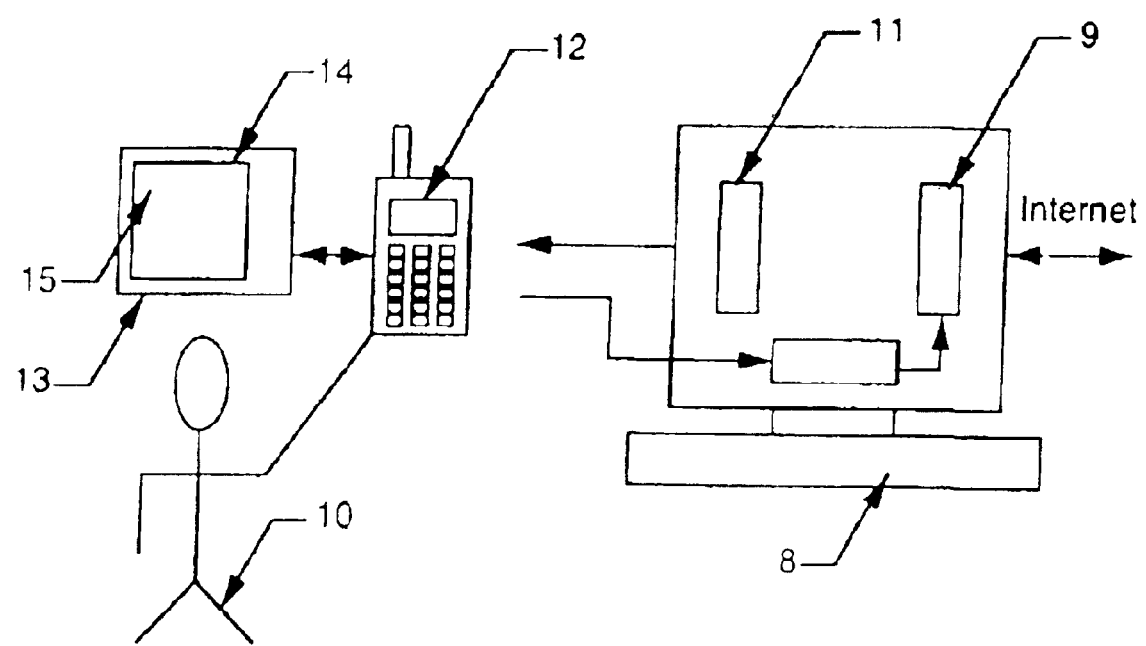
FIG. 2 illustrates a system in prior applications of the inventor.

A general description of the embodiments of prior applications of the inventor is disclosed in FIG. 2 with further reference to patent applications Ser. Nos. 09/496,172, 09/501,585, 09/504, 809, 09/504,808, and 09/504,807. A host computer 8 is depicted which is connected to the Internet, and that host may also be a Web server. Running in the host computer, is a Web server program 9. When a remote user 10 requests to view a Web page (or electronic message etc.) the Web server software receives HTML, JAVA, or other types of information and transmits this information to another software, the Browser Translator 11. This software translates the information, (i.e. the entire image comprising graphics and text) received in the form of HTML, Java, etc. (as information may be gathered from different sources) and translates it to a black and white bit map or raster image. In another embodiment, the software translates the information into a raster or color image. The image contains the information that would normally be displayed on a single Web page. The translation program therefore, also acts as a virtual browser. The cellular telephone 12 of FIG. 2 is connected to the high speed internet access device 13 of the invention commonly referred to as a PDA (Personal Digital Assistant) which is comprised of a display screen 14, battery and related micro-electronics. This enables the PDA to receive, decompress and view the bit map image sent from the virtual browser, and more importantly, through cellular phone connectivity to be able to input data from the PDA directly onto the server 8. In particular, the host computer or server of FIG. 2 and FIG. 4 receives vector information or compressed data in the form of HTML, JPEG, etc., which is displayed on a web page. The virtual browser virtually displays a virtual image on the server by rasterizing the image, or decompressing parts of the image and putting it into memory. That image, in whole or parts, is recompressed and sent to the PDA. The recompressed data format sent to the PDA, is not necessarily in the same format as the compressed data format first received by the server. For example, the incoming data from a Web page may be in the form of JPEG which is decompressed and displayed on the virtual browser. This data is recompressed and sent to the PDA but can be in the form of TIFF G4 or other formats, and not necessarily JPEG as initially received.

Another embodiment of the invention involves the server receiving vector information such as HTML or text and then rasterizing it to bit map format. It can then be shown in memory through the virtual browser and is recompressed through a "loss less" method and sent to the PDA.

Figure 3:
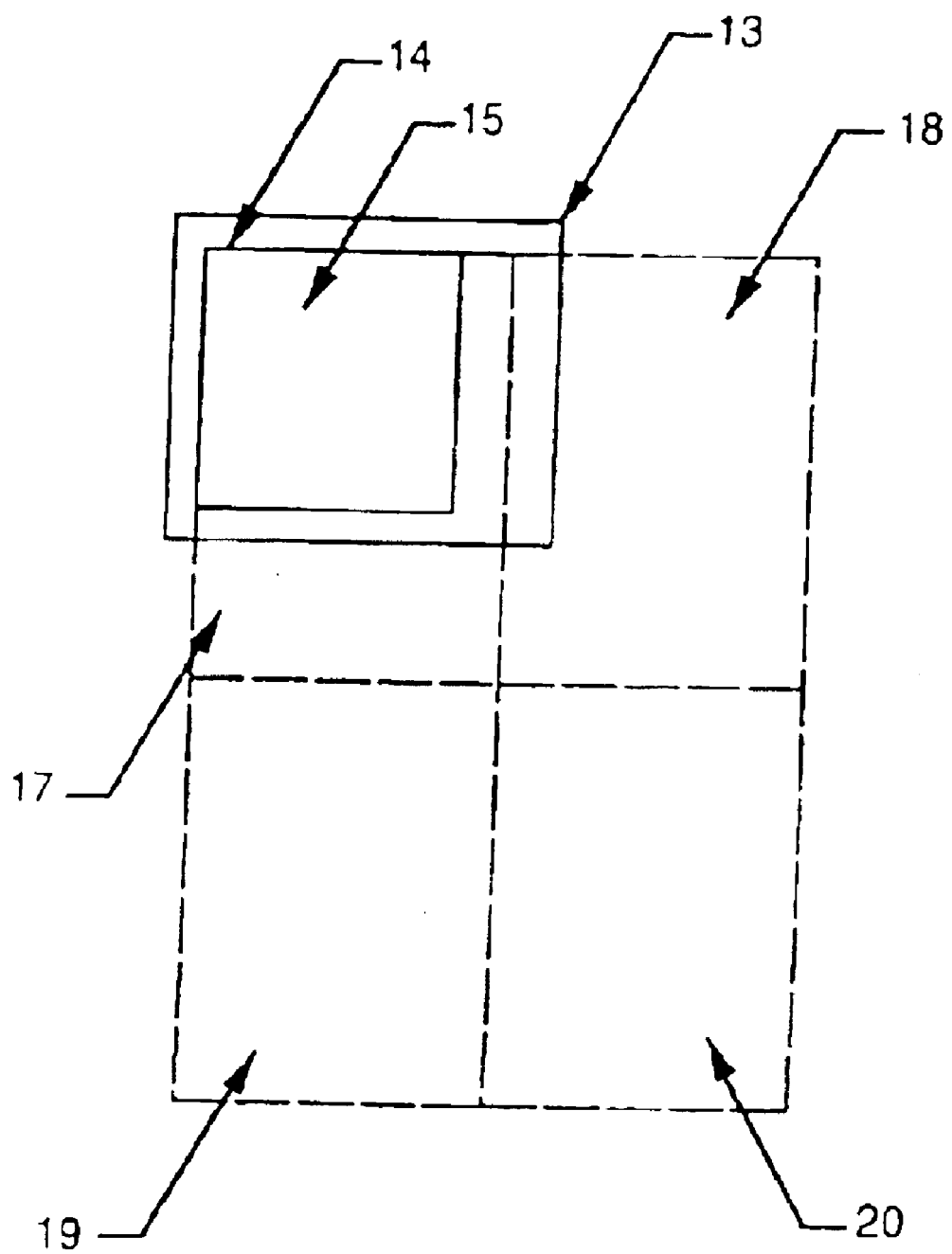
FIG. 3 illustrates the displayable area of the PDA device with respect to portions of the image, which are sequentially decompressed prior to viewing.

The information is received by the device 13 in FIG. 2, which has the ability to display a monochrome or color image 15, in its display window 14. The information is decompressed and displayed in the order of priority such that part of the image 17 of FIG. 3, which substantially or completely covers the displayable area 14 of the device, is decompressed and displayed first and then sequentially the portions 18, 19 and 20 of the image are decompressed, and stored in an internal memory of the device to be displayed later when the user scrolls up, down, or sideways to these parts of the image.

A principle embodiment of the present invention of FIG. 4 contains the host computer 21 which contains an RDP server 22 which is a software unit having multiple virtual machines 23 contained within, with each virtual machine containing a web browser 24. Multiple RDP clients 25 interact with the virtual machines with a dedicated virtual machine for each RDP client. Each RDP client 25 is represented by software, which sends the display of each virtual machine 23 to a single remote PDA device 26 via a dedicated modem port 27. Each modem port 27 allows a two-way communication between a single PDA 26, connected to a cellular phone 64, and a dedicated virtual machine 23 on the RDP server, via a single dedicated RDP client 25. By implementing multiple virtual machines and multiple RDP clients with multiple modem ports, it is now possible to communicate with multiple users of PDA devices on the RDP server to facilitate Internet browsing, electronic message communication, etc. The RDP client 25 relays information received from the PDA 26, such as mouse clicks or keyboard commands, via a modem port 27 to the Browser 24 in the virtual machine 23, which is then processed and a refreshed display sent back to the PDA via the same dedicated RDP client and modem port. The browser on each virtual machine relays display information to the dedicated RDP client such as bitmap files, vector files, commands, buffer information, etc. The RDP client then rasterizes some of the information by drawing it into memory and then proceeds to break up this file into smaller blocks of information. These blocks are compressed and sent to the PDA device through a dedicated modem port connected to each RDP client, as further illustrated in FIG. 5. The PDA would then receive, decompress and assemble the blocks of information in the original order as first received by the RDP client before the RDP client breaks up into smaller blocks. The browser running in each virtual machine rasterizes most of the information which is sent to the RDP client such as text, etc., but the RDP client may have to rasterize other information such as blocks, etc.

Figure 5:
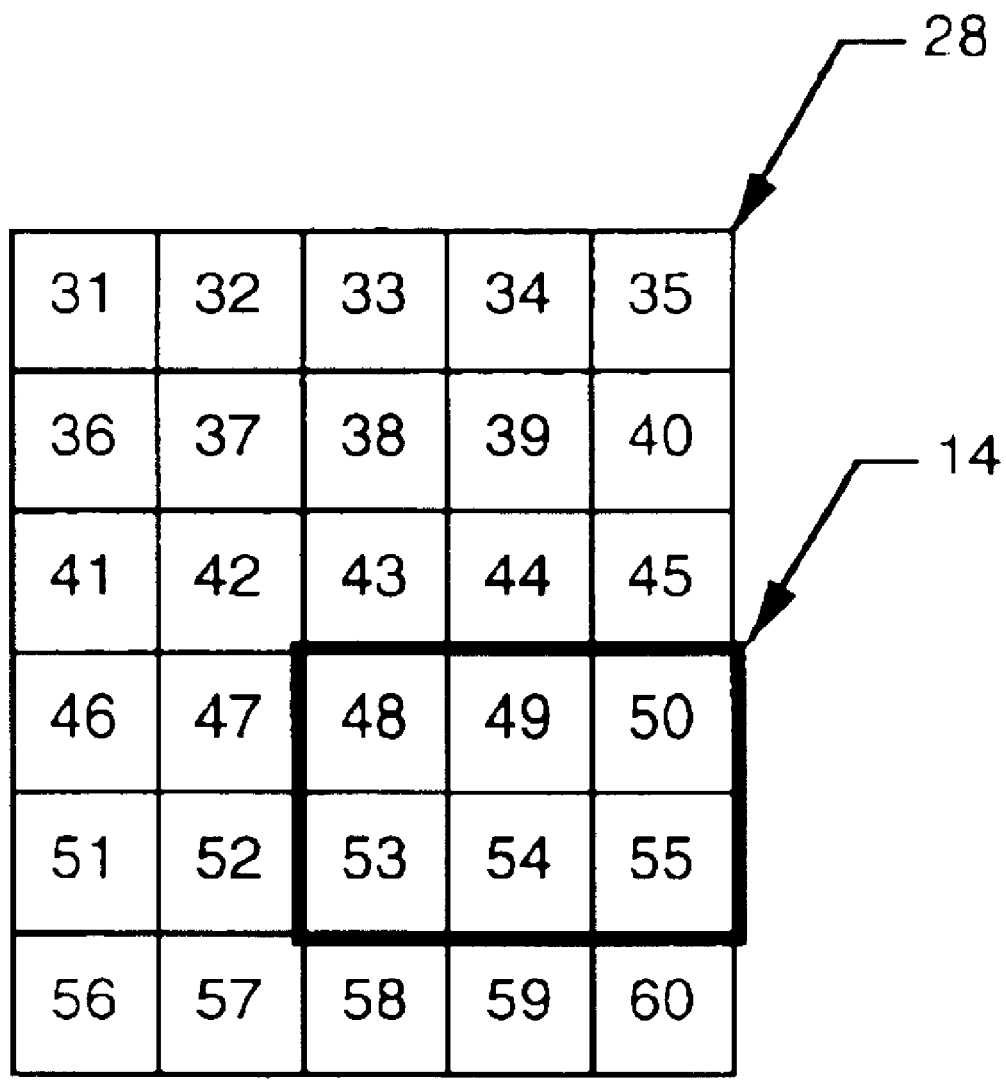
FIG. 5 illustrates a block diagram of the virtual page with respect to the viewing area of the PDA.

The PDA 26 of FIG. 4 sends specific data to the virtual machine 23 informing of the current location of the displayable area 14 of the PDA screen with respect to the larger image or virtual page 28 sent from the browser to the RDP client then to the PDA, as illustrated in FIG. 5. This is necessary, as the area displayed 14 by the PDA is smaller than the displayable image on the RDP client, referred to as the virtual page 28. The dedicated RDP client would send compressed blocks of data representing the image to be displayed in order of priority, such that the first blocks sent to and decompressed by the PDA are in the displayable area 14 of the PDA, which is the current area where the user is viewing. The PDA would then decompress blocks surrounding the displayed area 14 in a particular sequence, such as left to right across rows, and store the image in internal memory. The PDA assembles blocks of the image in a virtual page 28 stored in the PDA's internal memory, which comprises the entire image, thus enabling the user to access any part of the present image without communicating constantly with the RDP client. Hence, as the user scrolls across the image in any direction, the blocks of data comprising the image would already be decompressed and assembled priority-wise for instant viewing. Blocks of the image in closer proximity to the displayed area of the PDA screen get decompressed and stored into internal memory on higher priority than blocks further away. To explain in detail by referring further to FIG. 5, the image displayed on the PDA screen 14 can be comprised of blocks 48, 49, 50, 53, 54 & 55, which are sent from the RDP client first to the PDA, decompressed and then stored into memory first on the PDA. Then blocks 42, 43, 44, 45, 47, 52, 57, 58, 59 & 60 would be sent immediately after in that order from the RDP client to the PDA, to be decompressed and stored in the PDA's internal memory. This enables a rapid refresh rate of the displayed image especially when scrolling, as areas surrounding the displayed image would be decompressed and already stored in memory. The PDA continuously sends its current location to the RDP client to keep getting refreshed data instantaneously, should the location change by the user scrolling around or outside the virtual page 28, to enable the RDP client to always have the viewing area and surrounding blocks sent to the PDA.

A mouse click or any keyboard command on the PDA is given priority in communication between the PDA and the RDP server. Such actions from the PDA are sent instantaneously, interrupting the current activities and this action directed to the web browser on the dedicated virtual machine, which sends a refreshed image back to the PDA device through the RDP client. This feature allows the user to have rapid response to commands. If the user initiates a mouse click or keyboard command on the PDA that does not change the displayed image on the RDP server, then the original activities are continued almost instantly with minimum interruption. However, if the image is changed and refreshed on the RDP server, any old image being sent is stopped and the new image is sent immediately to the PDA if it is a full screen image occupying all or part of the PDA display screen. If the refreshed image sent occupies a part of the PDA display screen and also areas outside the display screen, then the portion of the refreshed image that is displayed on the PDA display screen is sent first to the PDA, and blocks of the image surrounding the PDA displayed image are sent next to the PDA which are decompressed and stored in internal memory, as previously described. Hence the PDA would assemble blocks of the image in the virtual page, which comprises the entire image, starting first with the current location of the PDA display screen then areas around it.

A beacon is sent from the PDA device to the RDP client and vice-versa many times per minute to confirm that a connection is established and maintained, for the duration of use. In the instance a user is disconnected, either the PDA or the RDP client will not receive a beacon and a time-out will be initiated, whereby both the PDA and RDP client disconnect and then reconnect. The user would still be able to view the present image and scroll around it as this image would already be decompressed in order of priority and stored in internal memory. The PDA would indicate in a message area that a reconnect sequence was initiated, and the status of this connection to the same RDP client as before, which would refresh the PDA with the image if it has changed once reconnection is established. Similarly, the PDA would continue downloading blocks of information after being reconnected if a disconnection interrupted this operation. A beacon is not necessarily sent from the RDP client at times when it is sending information to the PDA. As long as the PDA is receiving information such as a refreshed image, or a beacon, it knows a connection is established. Consequently, when there is no new activity in the virtual machine, the RDP client must send a beacon to the PDA to confirm the connection is established. The PDA device must always send beacons to the RDP client, as commands are not sent frequently from the PDA and only for a short duration when sent.

Figure 6:
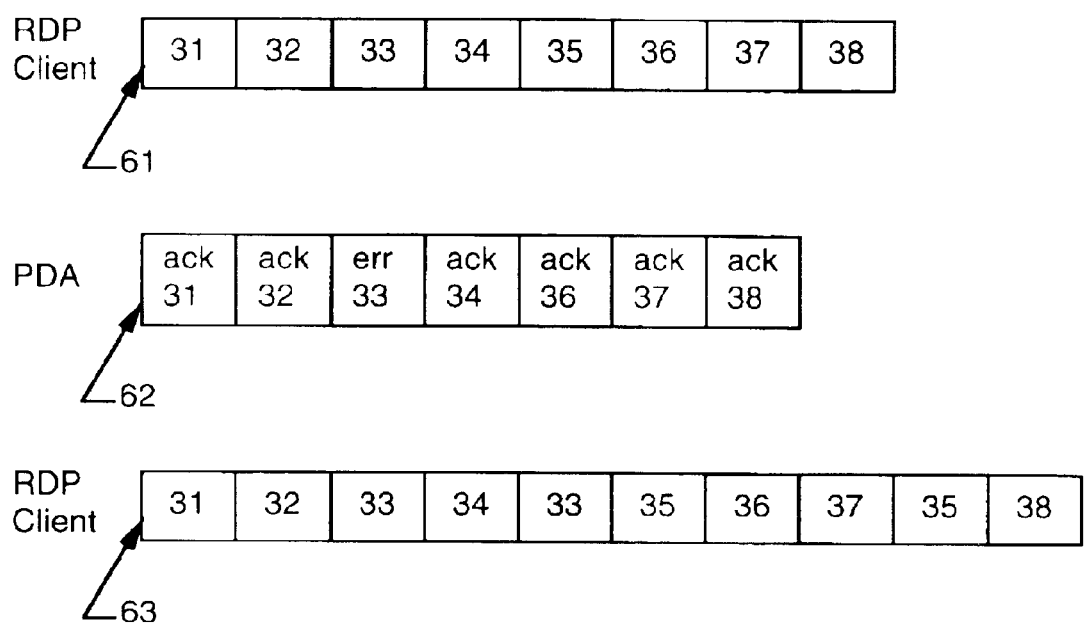
FIG. 6 illustrates the error protocol as blocks of information are sent from the RDP client to the PDA device.

An error protocol is implemented to verify that all information blocks are received and can be decompressed successfully. As previously described, the image displayed in the virtual browser in the virtual machine on the RDP server is broken down into smaller blocks of information and compressed and transmitted to the PDA device. The blocks are then assembled in correct sequence, decompressed and stored in internal memory on the PDA. Each block of information received is acknowledged by the PDA, which sends a signal confirming that each block is successfully received. Hence, the RDP client can monitor the successful decompression of all blocks of information sent to the PDA, and would know when a block is not acknowledged. The RDP client would also inform the PDA of the number of transmitted blocks of information, with each block identified numerically. The PDA also initiates another error protocol when a block of information received can not be successfully decompressed and stored in memory. In this case, the PDA would send an error message to the RDP client informing which block of information needs to be sent again, and the RDP client would send this block after it has completed sending the current block of information. The RDP client would monitor the acknowledgement of all blocks of information successfully decompressed, including blocks sent again after receiving error messages from the PDA device. To illustrate this further, reference is made to FIG. 6 which shows a string of data blocks 61 to be sent from the RDP client to the PDA device. As the PDA receives the data blocks acknowledgements or error messages 62 are sent back to the RDP client. Since the RDP client responds to all data from the PDA, the string of data blocks actually sent from the RDP client to the PDA is represented by 63. To further explain the events of the RDP client 63, blocks 31, 32, 33 & 34 are sent in this order from the RDP client to the PDA, with successful acknowledgements ack31 & ack32 sent from the PDA to the RDP client, but whilst block 34 is being sent, an error message in block 33 is relayed from the PDA, resulting in the RDP client sending this block 33 again as soon as block 34 is sent. The RDP client resumes sending blocks 35, 36 and 37, but notices no acknowledgement for block 35 after receiving successful acknowledgements ack34 & ack36 sent from the PDA, which results in the RDP client sending block 35 after block 37 is sent. The RDP client may also respond faster or slower to acknowledgements or error messages as described above.

Figure 7:
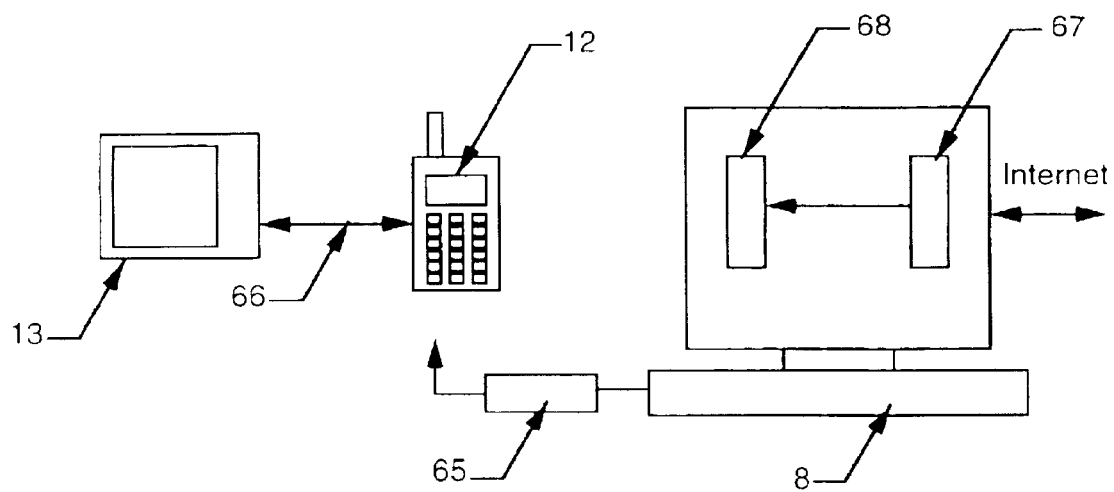
FIG. 7 illustrates communication methods between remote devices and host computers.

The current embodiment as illustrated in FIG. 7 teaches of a standard serial connection 66 between the PDA device 13 and a cellular phone 12, with an AT command set for communicating between modems. This allows the cellular phone 12 to act as a modem in communicating with another modem 65 attached to the host computer 8. Web pages 67 received from the Internet are converted to G4 files 68 then sent via modem to the PDA device.

Figure 8:
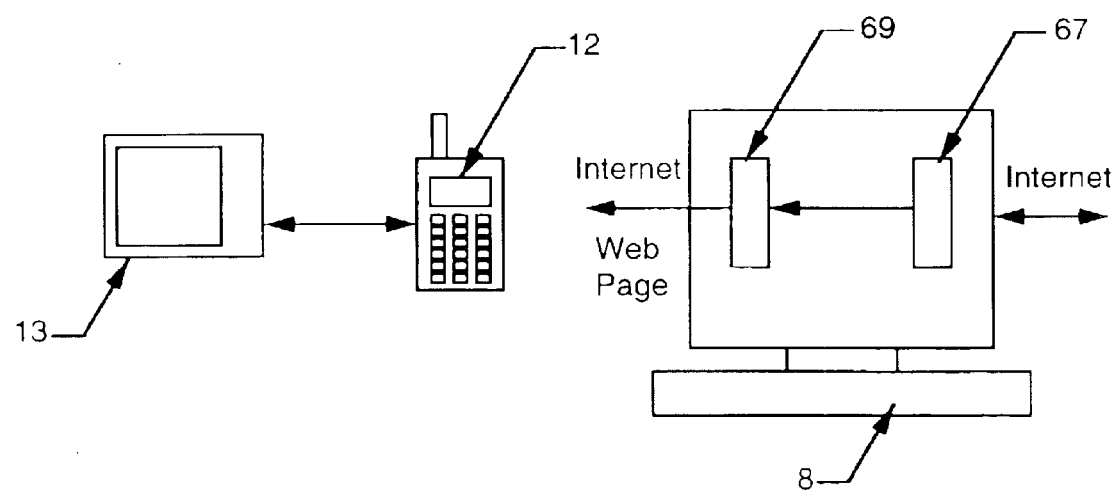
FIG. 8 illustrates a wireless communication method between the PDA and the Host Computer in accordance with another embodiment of the invention.

For a different type of cellular phone that does not allow AT command set communication but provides a TCPIP Internet connection, another embodiment of the invention is disclosed, as illustrated in FIG. 8. The PDA device would contain a browser to be able to view images sent by the host computer, which may be connected to the Internet. In this case, the PDA device 13 would contain a mini-browser, which understands and is capable of translating compressed G4 images. The PDA is connected to a cellular phone 12, which is connected to an Internet Service Provider (providing standard Internet services) instead of a modem at the Host Computer. The Host Computer is connected to the Internet and translates all web pages 67 to G4 compressed files 69. These G4 compressed files 69 are sent to the PDA in Internet protocol via the Internet Service Provider, and the mini-browser in the PDA is capable of translating the received images, and displaying on the PDA screen. Hence, the Host Computer has Internet images coming in and also Internet images being sent out. The Internet Service Provider (ISP) that the PDA connects to would always log on to one web page, and when the user at the PDA wants to go to a link or to a different web page, the click or the information is sent through the ISP to the host computer which will load the new page. This allows multiple users to dial up the Internet Service Provider to be able to view web pages from the Internet as desired, in this manner.

I claim:

1. A host computer which contains multiple virtual machines in software, each of the virtual machines containing a web browser, each of the virtual machines communicating with a dedicated client, the dedicated client being in software running on the host computer, the dedicated client converting information received from a corresponding one of the virtual machines into a display image, which is compressed and sent to a port for transmission to a remote portable display device.

2. A host computer as claimed in claim 1, wherein the display area of the portable display device is smaller than the image; according to a location of an area of the image to be displayed on the portable display device, the dedicated client sends the area of the image first and then automatically sends areas surrounding the area of the image.

3. A host computer as claimed in claim 1, wherein during the transmission of the image to the portable display device, a mouse click or keyboard command from the portable display device is relayed immediately to the dedicated client through the port; the dedicated client communicates with the web browser to send a new image to the portable display device if required, otherwise original activities are resumed.

4. A host computer as claimed in claim 1, wherein the port comprises a modem port for communication over a telephone connection; beacons are relayed between the portable display device and the client to confirm a telephone connection is established; a beacon not received is interpreted as a disconnection which initiates a reconnection sequence between the dedicated client and portable display device.

5. A host computer claimed in claim 1, wherein the dedicated client breaks the image into blocks for transmission in files; an error protocol verifies the files for the image sent from the dedicated client to the portable display device are successfully received, decompressed and acknowledged by the portable display device.

6. A host computer as claimed in claim 1, wherein the image is sent over the Internet to be viewed by the portable display device comprising a display screen.

7. A method to provide simultaneous remote access, the method comprising:

running multiple virtual machines on a computer system, each of the virtual machines executing an application program; and running multiple clients on the computer system, each of the clients:

communicating with one of the virtual machines to generate a display image of the corresponding one of the virtual machines, the display image showing the application program; and transmitting the display image in a compressed format to a remote device for display.

8. The method of claim 7, wherein the clients communicate with the virtual machines using a remote data protocol.

9. The method of claim 7, wherein a display area of the remote device is smaller than the display image; the method further comprises:

breaking the display image into blocks;

receiving an indication of an area of the display image to be displayed on the remote device; and transmitting one or more blocks to be displayed in the display area of the remote device before automatically transmitting blocks surrounding the one or more blocks.

10. The method of claim 9, wherein during said transmitting the method further comprises:

receiving a user input from the remote device to operate the application program;

if no new display image is generated from the user input, resuming said transmitting; and if a new display image is generated from the user input, transmitting the new display image in a compressed format to the remote device for display.

11. The method of claim 9, further comprising:

determining if a connection between the remote device and one of the clients is disconnected; and in response to a determination that the connection is disconnected, reconnecting the remote device and the corresponding one of the clients.

12. The method of claim 9, further comprising:

detecting an error in transmitting a block of the display image; and retransmitting the block of the display image without retransmitting the entire display image.

13. A machine readable medium containing executable computer program instructions which when executed by a data processing system cause said system to perform a method to provide simultaneous remote access, the method comprising:

executing multiple virtual machines on a computer system, each of the virtual machines executing an application program; and executing multiple clients on the computer system, each of the clients:

communicating with one of the virtual machines to generate a display image of the corresponding one of the virtual machines, the display image showing the application program; and transmitting the display image in a compressed format to a remote device for display.

14. The medium of claim 13, wherein the clients communicate with the virtual machines using a remote data protocol.

15. The medium of claim 13, wherein a display area of the remote device is smaller than the display image; the method further comprises:

breaking the display image into blocks;

receiving an indication of an area of the display image to be displayed on the remote device; and transmitting one or more blocks to be displayed in the display area of the remote device before automatically transmitting blocks surrounding the one or more blocks.

16. The medium of claim 15, wherein during said transmitting the method further comprises:

receiving a user input from the remote device to operate the application program;

if no new display image is generated from the user input, resuming said transmitting; and if a new display image is generated from the user input, transmitting the new display image is compressed format to the remote device for display.

17. The medium of claim 15, wherein the method further comprises:

determining if a connection between the remote device and one of the clients is disconnected; and in response to a determination that the connection is disconnected, reconnecting the remote device and the corresponding one of the clients.

18. The medium of claim 15, wherein the method further comprises:

detecting an error in transmitting a block of the display image; and retransmitting the block of the display image without retransmitting the entire display image.

* * * * *